(12) United States Patent
Takeuchi

(10) Patent No.: US 8,040,422 B2
(45) Date of Patent: Oct. 18, 2011

(54) VIEWFINDER AND IMAGE PICKUP APPARATUS

(75) Inventor: Yoshiyuki Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/410,900

(22) Filed: Mar. 25, 2009

(65) Prior Publication Data

US 2009/0251586 A1  Oct. 8, 2009

(30) Foreign Application Priority Data

Apr. 3, 2008 (JP) ................... 2008-097155

(51) Int. Cl.
*H04N 5/222* (2006.01)
*H04N 5/225* (2006.01)

(52) U.S. Cl. ............... 348/333.06; 348/333.07; 348/375

(58) Field of Classification Search ............. 348/333.01, 348/333.06, 375
See application file for complete search history.

(56) References Cited

U.S. PATENT DOCUMENTS

| 4,682,240 A * | 7/1987 | Bachmann ............... 348/333.06 |
| 6,778,775 B1 * | 8/2004 | Auffret ......................... 396/374 |
| 6,995,798 B1 * | 2/2006 | Endo et al. ............... 348/333.01 |
| 7,916,211 B2 * | 3/2011 | Okudaira ..................... 348/374 |

FOREIGN PATENT DOCUMENTS

| JP | 63-52352 | 4/1988 |
| JP | 9-139952 | 5/1997 |
| JP | 10-23300 | 1/1998 |
| JP | 2000-307903 | 11/2000 |

\* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

The present invention provides a viewfinder including: a rail removably attached to an image pickup apparatus; a seat coupled to the rail so as to be movable in an extending direction of the rail; a display panel formed in a rectangle having left and right sides and upper and lower sides to have a display surface on which an image picked up by the image pickup apparatus is displayed; and a pair of left and right arms supporting the display panel on the seat.

12 Claims, 17 Drawing Sheets

FIG. 8
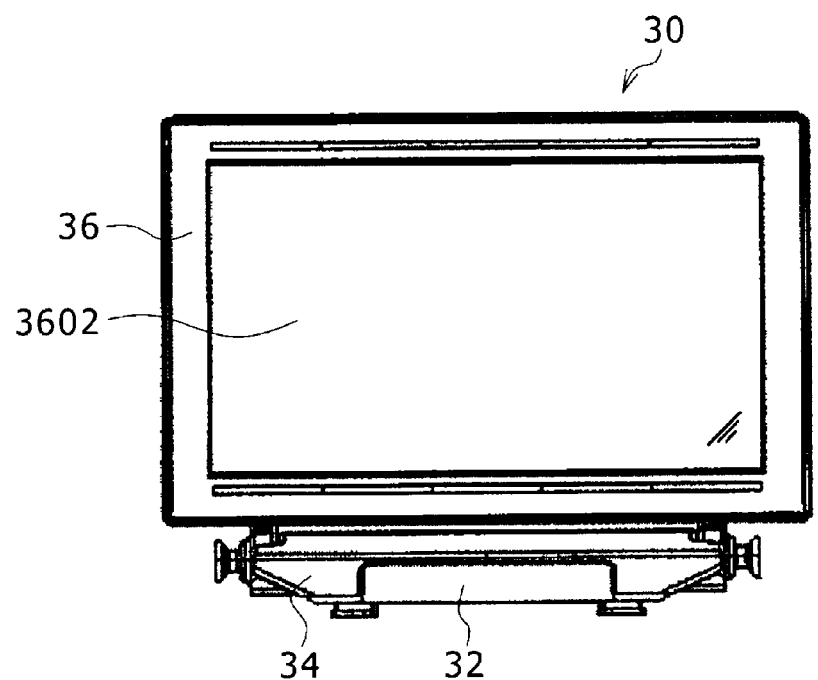
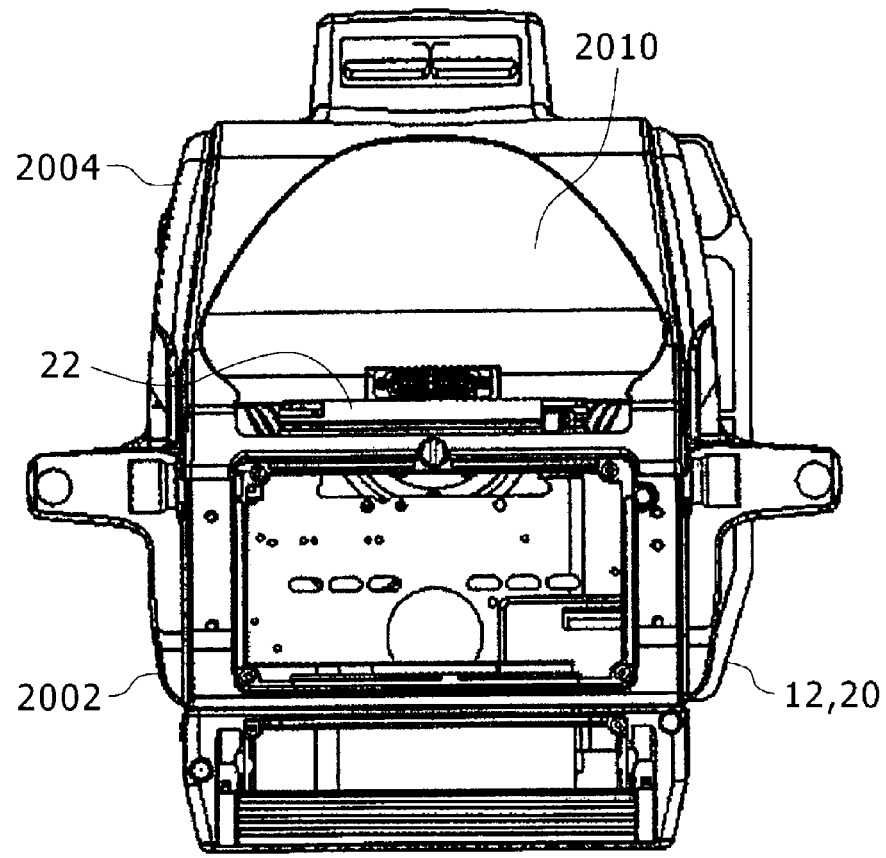

VIEWFINDER AND IMAGE PICKUP APPARATUS

BACKGROUND OF THE INVENTION

1. Field of the Invention

The present invention relates to a viewfinder and an image pickup apparatus.

2. Description of the Related Art

Professional-use image pickup apparatuses used in broadcast stations have been provided which include a camera body adapted to pick up an image of a subject and produce a video signal, and a viewfinder attached to the camera body and provided with a display adapted to display video based on the video signal.

In recent years, viewfinders that have a rectangular plate-like display panel such as a liquid crystal display device or a plasma display device have been used as the viewfinders as mentioned above. See Japanese Patent Laid-open No. Hei 10-23300.

The viewfinder is provided with an arm supporting a panel display on a camera body.

One end of the arm is connected to a turning member so as to be turnable around a lift axis perpendicular to a vertically extending pan axis. The turning member is provided on the camera body to turn around the pan axis.

In addition, the other end of the arm is connected to an upper portion of the rear surface of the display panel located oppositely to the display surface thereof so as to be turnable around a tilt axis parallel to the lift axis.

In this way, the arm can be pivoted around the lift axis to adjust the vertical position of the viewfinder. In addition, the viewfinder can be pivoted around the tilt axis to thereby adjust the orientation of the display surface of the viewfinder.

SUMMARY OF THE INVENTION

However, the traditional viewfinder described above is such that when the distance between user's eyes and the display surface of the viewfinder is adjusted according to the user's eyesight, the arm is pivoted around the lift axis to vary the vertical position of the display surface. This is disadvantageous to improve the visibility of the display surface.

Since the pivotal support point is located at the upper portion of the display panel, the distance between the user's eyes and the display panel is increased in variation when the display panel is pivoted. This is disadvantageous to ensure the visibility of the display surface.

It is desirable, therefore, to provide a viewfinder and an image pickup apparatus advantageous to improve visibility of a display panel and usability.

According to an embodiment of the present invention, there is provided a viewfinder including: a rail removably attached to an image pickup apparatus; a seat coupled to the rail so as to be movable in an extending direction of the rail; a display panel formed in a rectangle having left and right sides and upper and lower sides to have a display surface on which an image picked up by the image pickup apparatus is displayed; and a pair of left and right arms supporting the display panel on the seat; wherein one end of each of the arms is turnably connected to a corresponding one of left and right lateral portions of the seat, and the other end of each of the arms is turnably connected to a rear surface of the display panel at a vertically intermediate portion inside each of the left and right sides, the rear surface of the display panel being located oppositely to the display surface, the display panel is arranged to be brought into a first display state where the display surface is located on an upper surface of the seat so as to rise perpendicularly to the upper surface thereof and into a second display state where the display surface is located at a position away from the seat to face a direction away from the seat and to be perpendicular to an imaginary extending surface of the upper surface; and wherein in the first display state, a portion of each of the left and right arms located close to the rear surface of the display panel is located within an outline of the display panel as viewed from the display surface side.

According to another embodiment of the present invention, there is provided an image pickup apparatus including: a housing; and a viewfinder, the viewfinder including a rail removably attached to an image pickup apparatus, a seat coupled to the rail so as to be movable in an extending direction of the rail, a display panel formed in a rectangle having left and right sides and upper and lower sides to have a display surface on which an image picked up by the image pickup apparatus is displayed, and a pair of left and right arms supporting the display panel on the seat; wherein one end of each of the arms is turnably connected to a corresponding one of left and right lateral portions of the seat, and the other end of each of the arms is turnably connected to a rear surface of the display panel at a vertically intermediate portion inside each of the left and right sides, the rear surface of the display panel being located oppositely to the display surface, the display panel is arranged to be brought into a first display state where the display surface is located on an upper surface of the seat so as to rise perpendicularly to the upper surface thereof and into a second display state where the display surface is located at a position away from the seat to face a direction away from the seat and to be perpendicular to an imaginary extending surface of the upper surface; and in the first display state, a portion of each of the left and right arms located close to the rear surface of the display panel is located within an outline of the display panel as viewed from the display surface side.

According to the embodiment of the present invention, the viewfinder can be mounted to the image pickup apparatus so as to be movable along the rail; therefore, the distance between the user's eyes and the display surface of the display panel can be adjusted according to user's eyesight without variation in the vertical position of the display surface. Thus, it is easy to visually recognize the display surface, which is advantageous to improve the operability.

The other end of each of the arms is turnably connected to the rear surface of the display panel at the vertically intermediate portion inside each of the left and right sides thereof. Therefore, the distance between the user's eyes and the display surface is small in variation in pivoting the display panel compared with the case where the pivotal support point of the display panel is located at the upper portion thereof. Thus, this is advantageous to ensure the visibility of the display surface.

BRIEF DESCRIPTION OF THE DRAWINGS

FIG. 8 is a view as viewed from arrow A of FIG. 7;

DETAILED DESCRIPTION OF THE PREFERRED EMBODIMENTS

Preferred embodiments of the present invention will be described with reference to the drawings.

An image pickup apparatus 10 according to an embodiment is first described and a viewfinder 30 attached to the image pickup apparatus 10 is next described.

Figure 1:
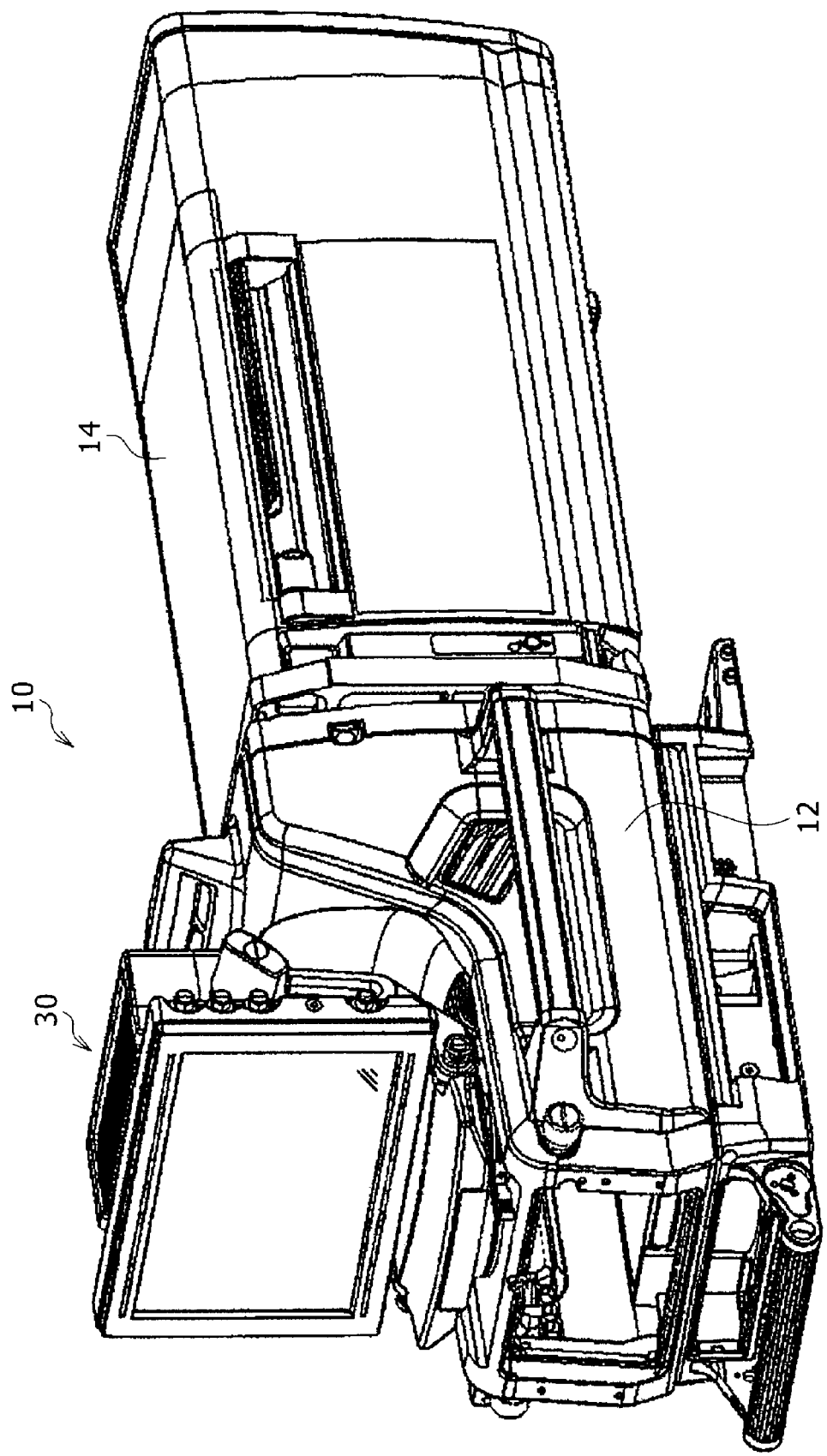
FIG. 1 is a perspective view of an image pickup apparatus attached with a viewfinder.
Figure 2:
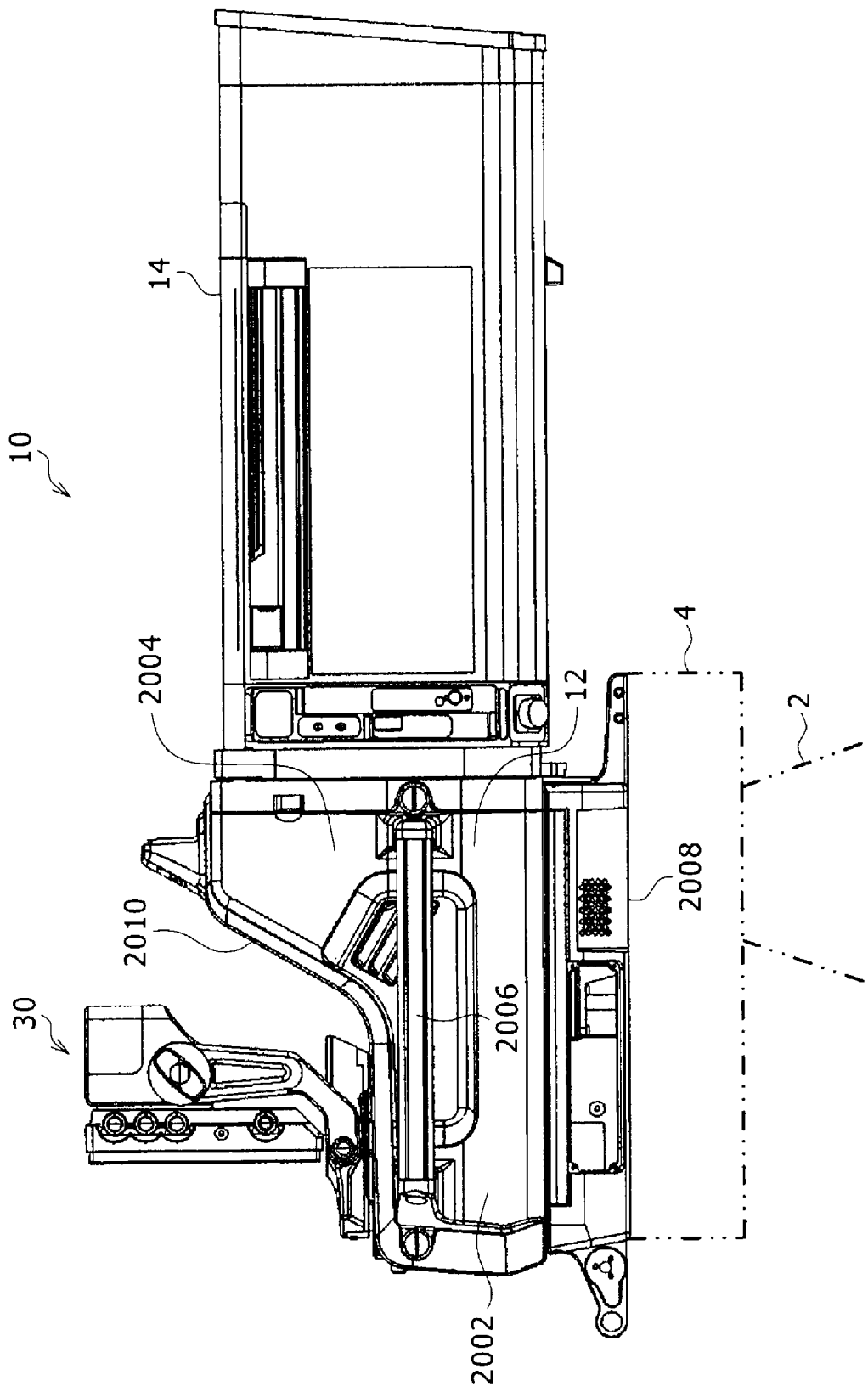
FIG. 2 is a lateral view of FIG. 1.
Figure 3:
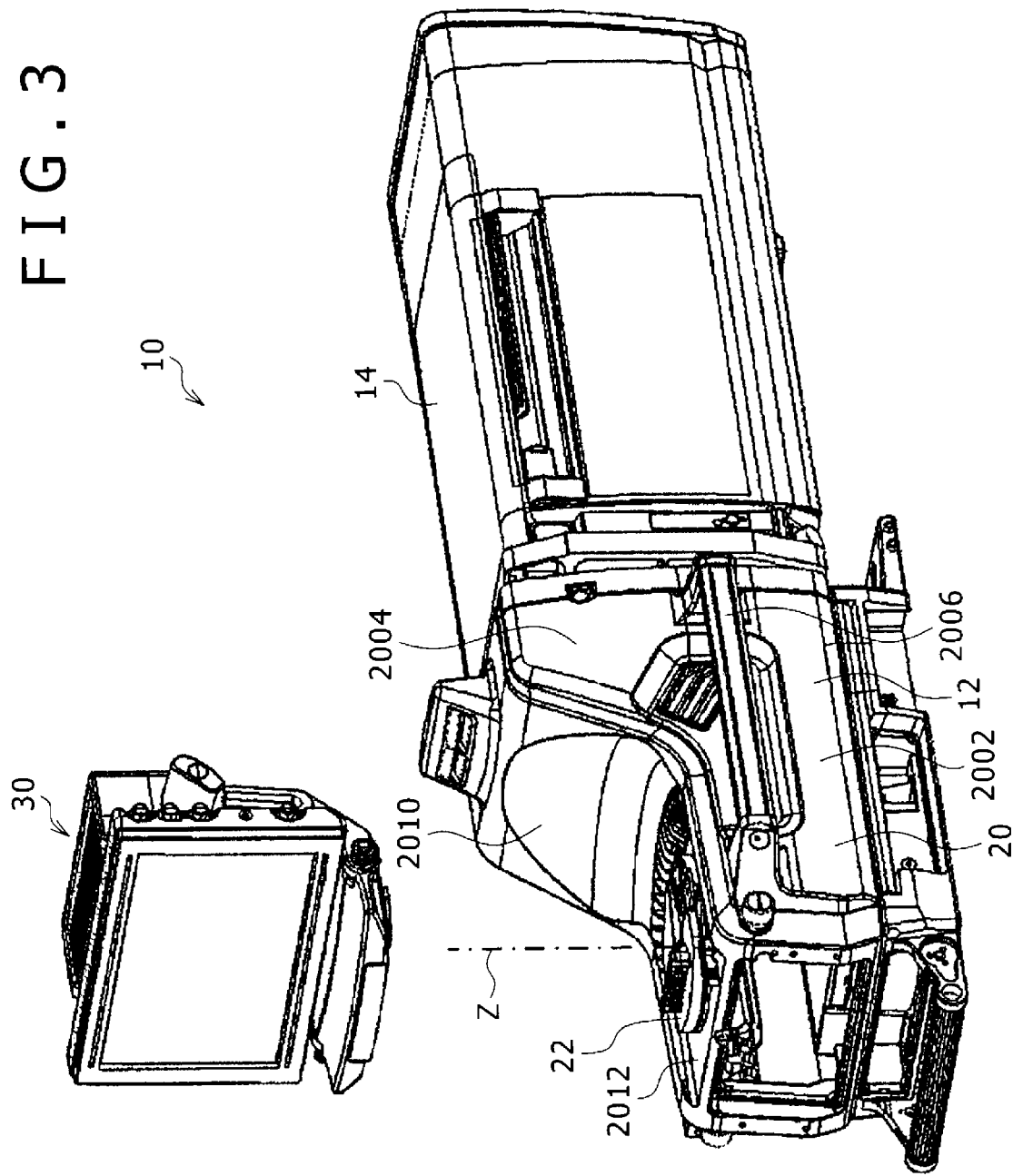
FIG. 3 is a perspective view of the image pickup apparatus from which the viewfinder is removed.
Figure 4:
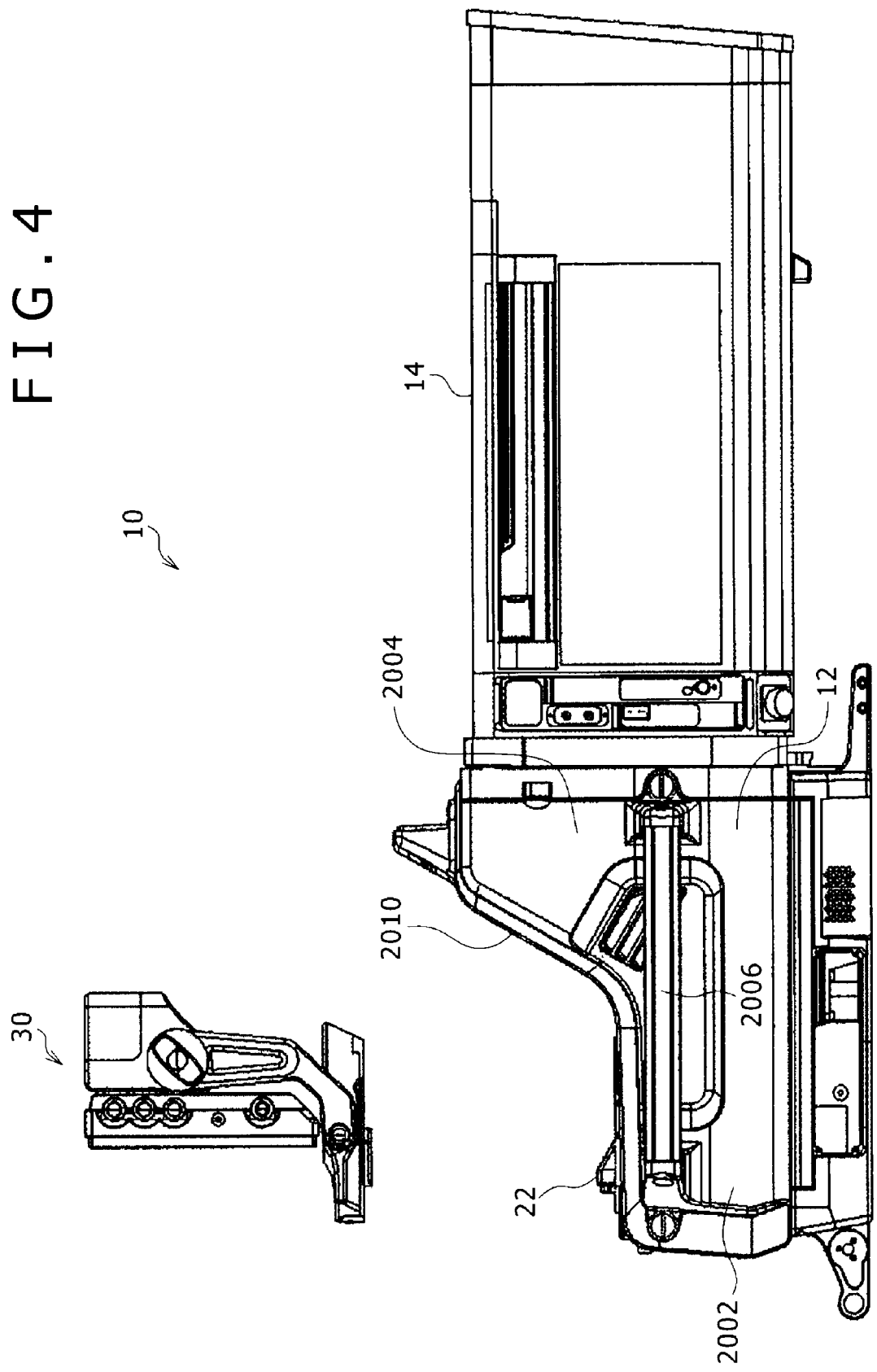
FIG. 4 is a lateral view of FIG. 3.
Figure 5:
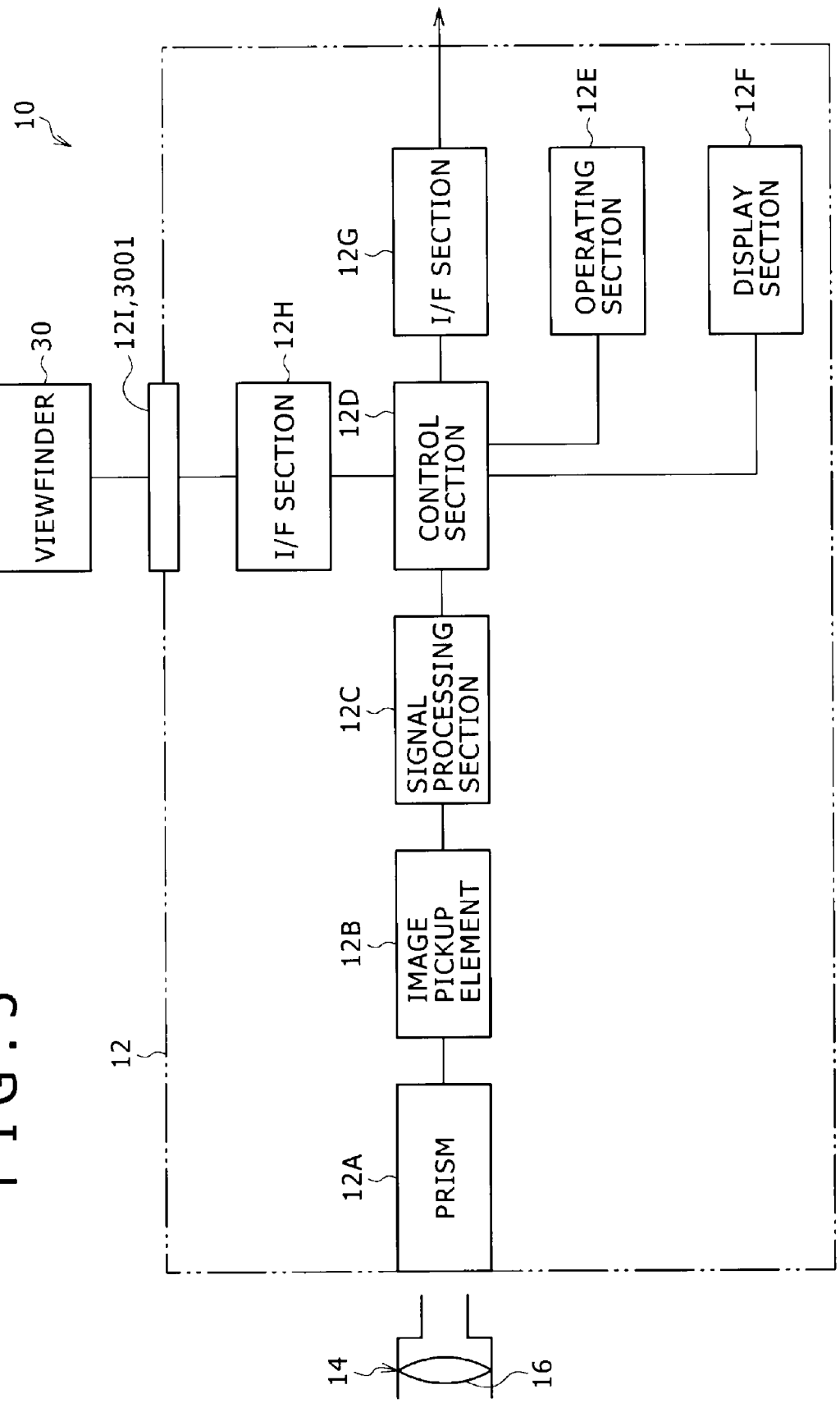
FIG. 5 is a block diagram illustrating a configuration of the image pickup apparatus.

FIG. 1 is a perspective view of the image pickup apparatus 10 attached with the viewfinder 30 and FIG. 2 is a lateral view of FIG. 1. FIG. 3 is a perspective view of the image pickup apparatus 10 from which the viewfinder 30 is removed and FIG. 4 is a lateral view of FIG. 3. FIG. 5 is a block diagram illustrating a configuration of the image pickup apparatus 10.

(Control System of the Image Pickup Apparatus 10)

A description is first given of a control system of the image pickup apparatus 10.

The image pickup apparatus 10 is a professional-use image pickup apparatus used in a studio of a broadcast station.

Referring to FIG. 5, the image pickup apparatus 10 includes an image pickup optical system 16 adapted to lead a subject image to an image pickup element 12B.

The image pickup element 12B can adopt a CCD (Charge Coupled Device), a C-MOS (Complementary Metal Oxide Semiconductor) sensor or other traditionally known image pickup elements.

The image pickup apparatus 10 includes a prism 12A, a signal processing section 12C, a control section 12D, an operating section 12E, a display section 12F, and two I/F (Interface) sections 12G, 12H in addition to the image pickup element 12B.

In the present embodiment, three image pickup elements 12B are provided for three respective colors (red, green, blue). The prism 12A is adapted to separate an optical flux forming the subject image led from the image pickup optical system 16, into three colors (red, green, blue), and leads them to the respective associated image pickup elements 12B for three respective colors (red, green, blue).

The signal processing section 12C drives the image pickup elements 12B and performs e.g., CDS (Correlated Double Sampling) on the video signals supplied from the image pickup elements 12B for maintaining a satisfactory S/N ratio and AGC (Automatic Gain Control) for controlling gain. Further, the signal processing section 12C performs A/D (Analog/Digital) conversion to create video data as digital signals. After having performed such a series of preprocessing as described above, the signal processing section 12C then compresses or encodes the preprocessed video data by a predetermined compression technology for creating predetermined video data. The vide data thus created is supplied from the control section 12D via the I/F sections 12G to an associated external device.

In addition, the signal processing section 12C supplies an analog video signal not yet processed to a digital signal, to a viewfinder 30 described later via a connector 12I, thus displaying on-camera images on the viewfinder 30.

Incidentally, the connector 12I is provided on a turntable 22 described later illustrated in FIGS. 7 and 17. When the viewfinder 30 is mounted on the turning table 22, a connector 3001 of the viewfinder 30 is coupled to the connector 12I.

The one I/F section 12G of the two I/F sections is adapted to supply the video data that has been supplied from the signal processing section 12C via the control section 12D, to an external device installed in the studio.

The other I/F section 12H of the two I/F sections is adapted to exchange the video signal and control signals associated with such exchange between the control section 12D and the viewfinder 30.

The operating section 12E is composed of switches, volumes, etc. operated to perform various settings associated with the operation of the image pickup apparatus 10.

The display section 12F is composed of a display, an LED (Light-emitting Diode) lamp, etc. for displaying the operating states of the image pickup apparatus 10.

The control section 12D is adapted to control the signal processing section 12C, the I/F sections 12G, 12H, the operating section 12E and the display section 12F described above.

Specifically, the control section 12D is composed of a microcomputer. This microcomputer includes a CPU (Central Processing Unit), a RAM (Random Access Memory) for offering a working area, a ROM (Read Only Memory) for storing a control program, etc., and a peripheral LSI (Large Scale Integration) adapted to give and receive control signals and data signals among the signal processing section 12C, the I/F sections 12G, 12H, the operating section 12E, and the displaying section 12F. The CPU executes the control program of the ROM to perform various control operation.

(Camera Body 12)

As illustrated in FIGS. 1 and 3, the image pickup apparatus 10 includes a camera body 12 extending backward and forward and a lens barrel 14 is mounted to the front of the camera body 12.

Incidentally, in the camera body 12, the left and right are referred to with the image pickup apparatus 10 viewed from the rear and the subject side and the image pickup element side in the optical-axial direction of the image pickup optical system are referred to as the front and the rear, respectively.

The lens barrel 14 is adapted to accommodate the image pickup optical system 16 (FIG. 5).

In the present embodiment, the lens barrel 14 is formed rectangle in cross-section and extends backward and forward.

Referring to FIGS. 3 and 4, the camera body 12 includes a housing 20 forming an exterior.

The housing 20 includes a lower portion 2002 extending backward and forward and a rising portion 2004 rising from the front portion of the lower portion 2002.

The lens barrel 14 and the housing 20 are joined together by mating the front surface of the rising portion 2004 with the rear portion of the lens barrel 14.

A handle 2006 is attached to the left and right lateral portions of the lower portion 2002.

As illustrated in FIG. 2, lower portion 2002 is provided with a tripod mounting portion 2008 to which a camera platform 4 of a tripod 2 is removably mounted.

Referring to FIGS. 3 and 4, a concave portion 2010 is provided on the lower portion 2002 and rearward of the rising portion 2004 so as to open left-right laterally, upward and rearward.

Figure 17:
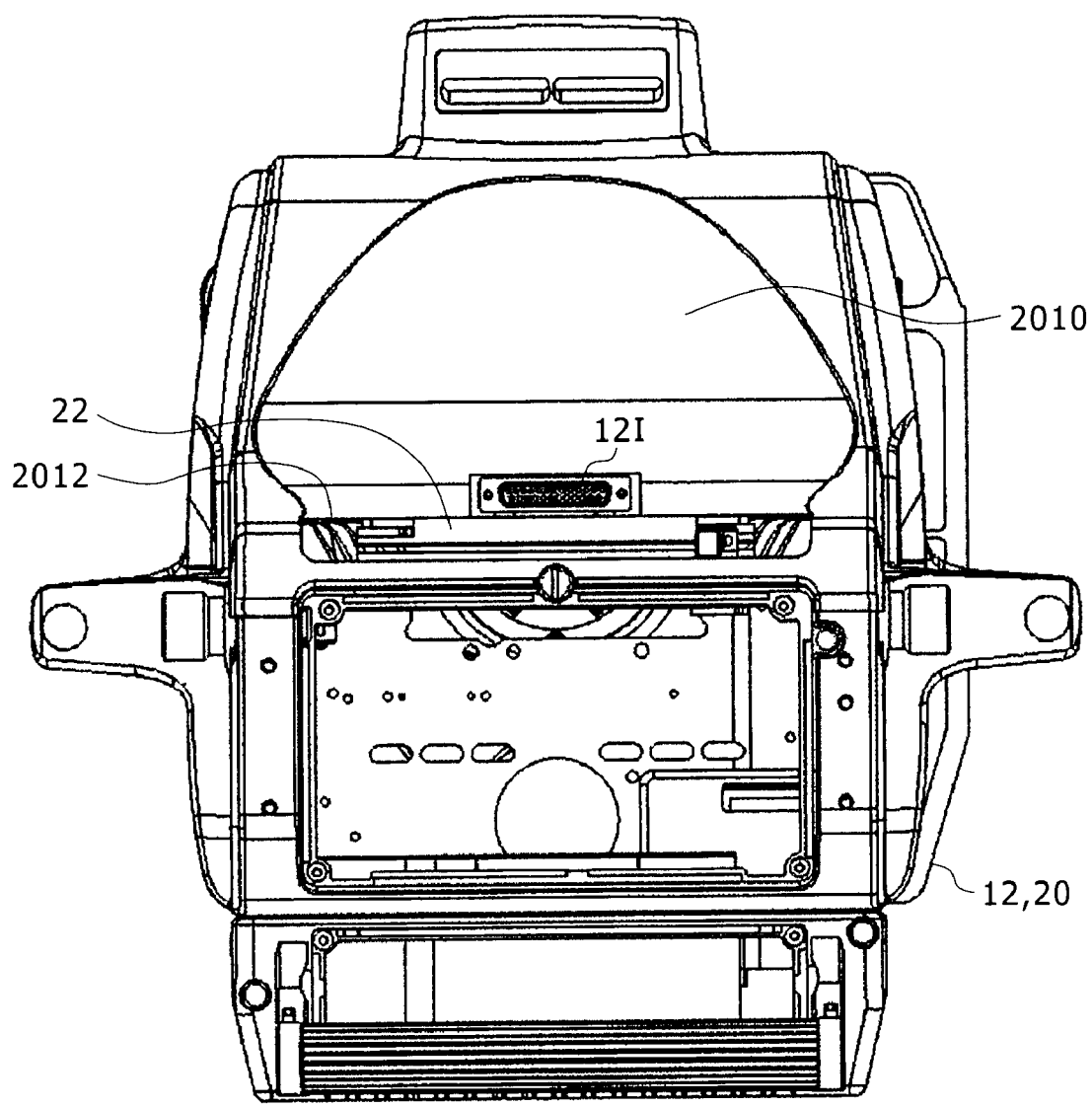
FIG. 17 is a rear view of the camera body from which the viewfinder is removed.

As illustrated in FIGS. 3 and 17, the turntable 22 is provided on a bottom surface 2012 of the concave portion 2010, i.e., on the upper surface of the lower portion 2002.

The turntable 22 is configured to be turnable around a vertically extending axis Z.

A lock mechanism is attached to the turntable 22 so as to hold it at a desired turning position.

Incidentally, the structure of rotatably supporting the turntable 22 and of the lock mechanism of holding the turntable 22 at a desired rotating position can adopt traditionally known configurations.

(Viewfinder 30)

A description is next given of the viewfinder 30.

Figure 6:
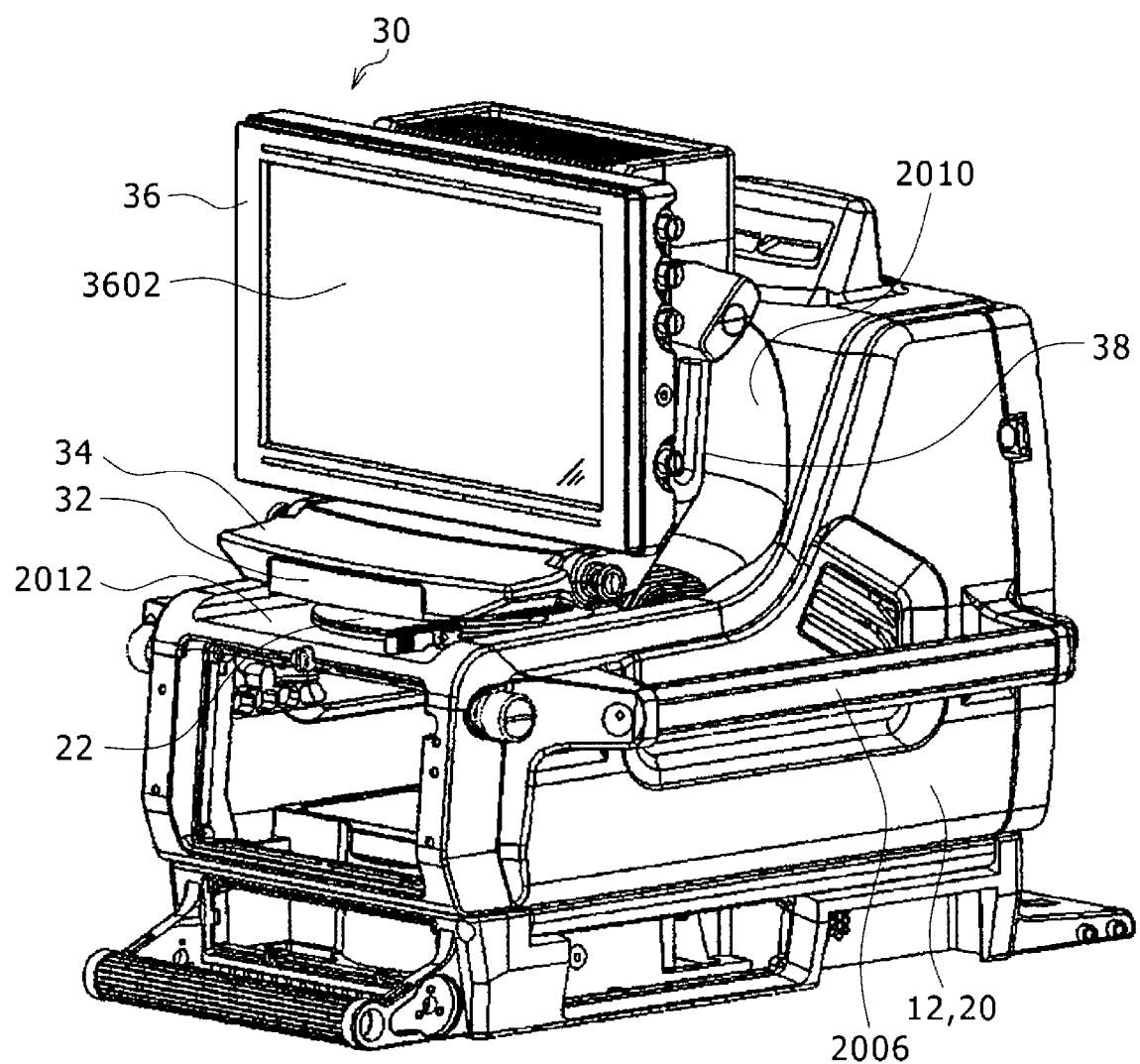
FIG. 6 is a perspective view of the viewfinder mounted to a camera body.
Figure 9:
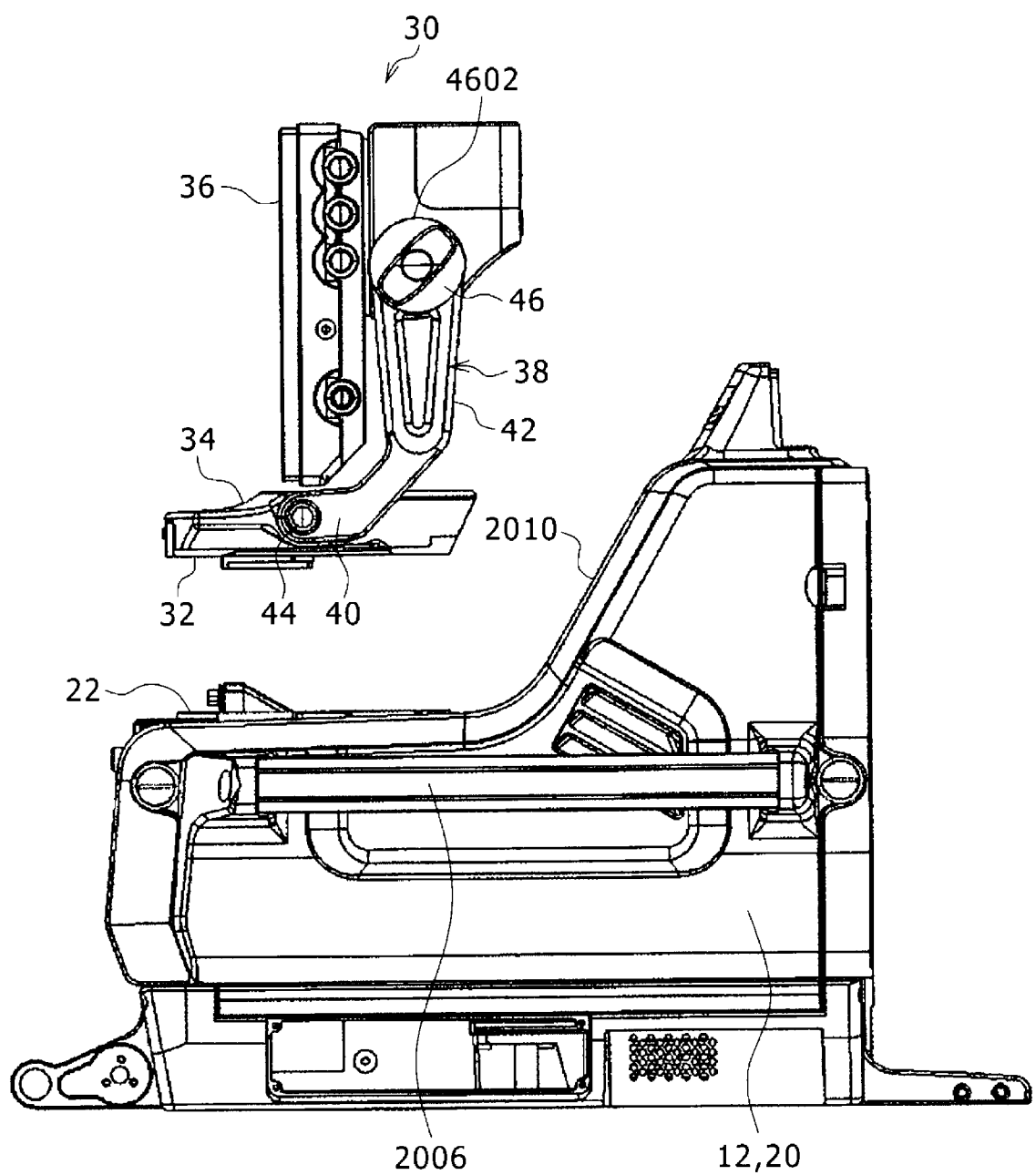
FIG. 9 is a view as viewed from arrow B of FIG. 7.

FIG. 6 is a perspective view of the viewfinder 30 mounted to the camera body 12. FIG. 7 is a perspective view illustrating mounting operation of the viewfinder 30 to the camera body 12. FIG. 8 is a view as viewed from arrow A of FIG. 7 and FIG. 9 is a view as viewed from arrow B of FIG. 7.

Figure 10:
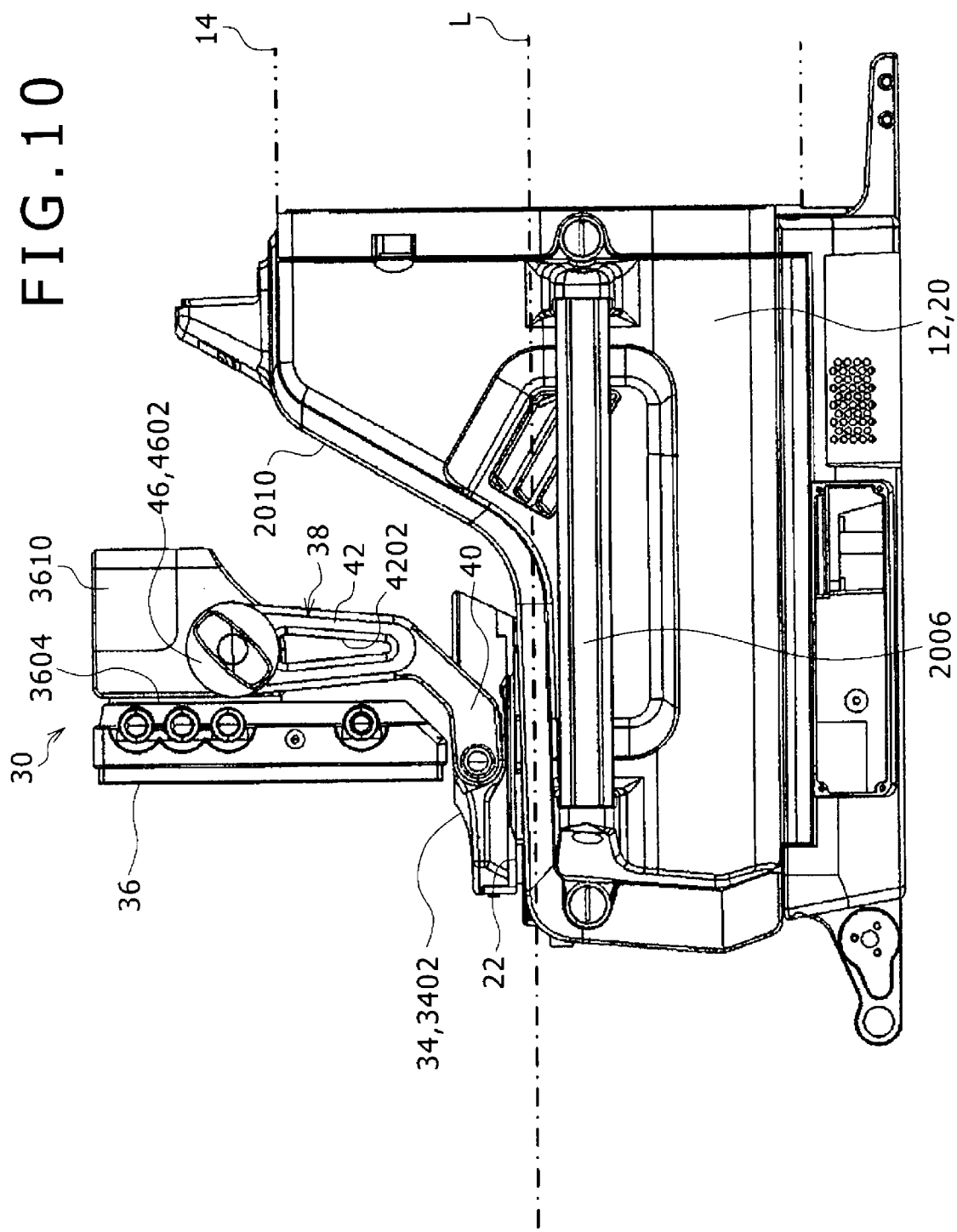
FIG. 10 is a lateral view illustrating a state where a display panel in a first display state is located at the rear end of a rail.

FIG. 10 is a lateral view illustrating a state where a display panel 36 in a first display state is located at the rear end of a rail 32.

Figure 11:
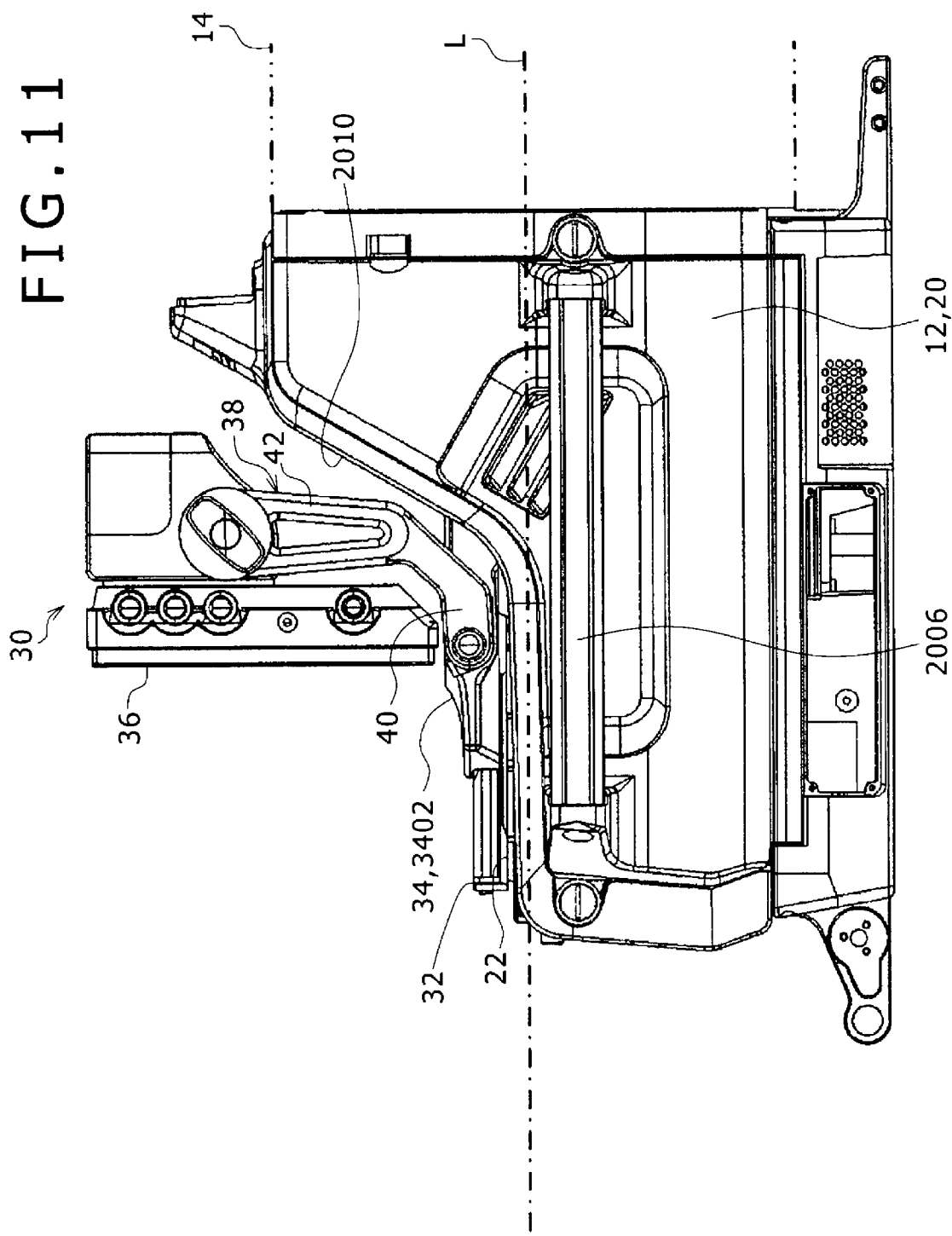
FIG. 11 is a lateral view illustrating a state where the display panel in the first display state is located at the front end of the rail.

FIG. 11 is a lateral view illustrating a state where the display panel 36 in the first display state is located at the front end of the rail 32.

Figure 12:
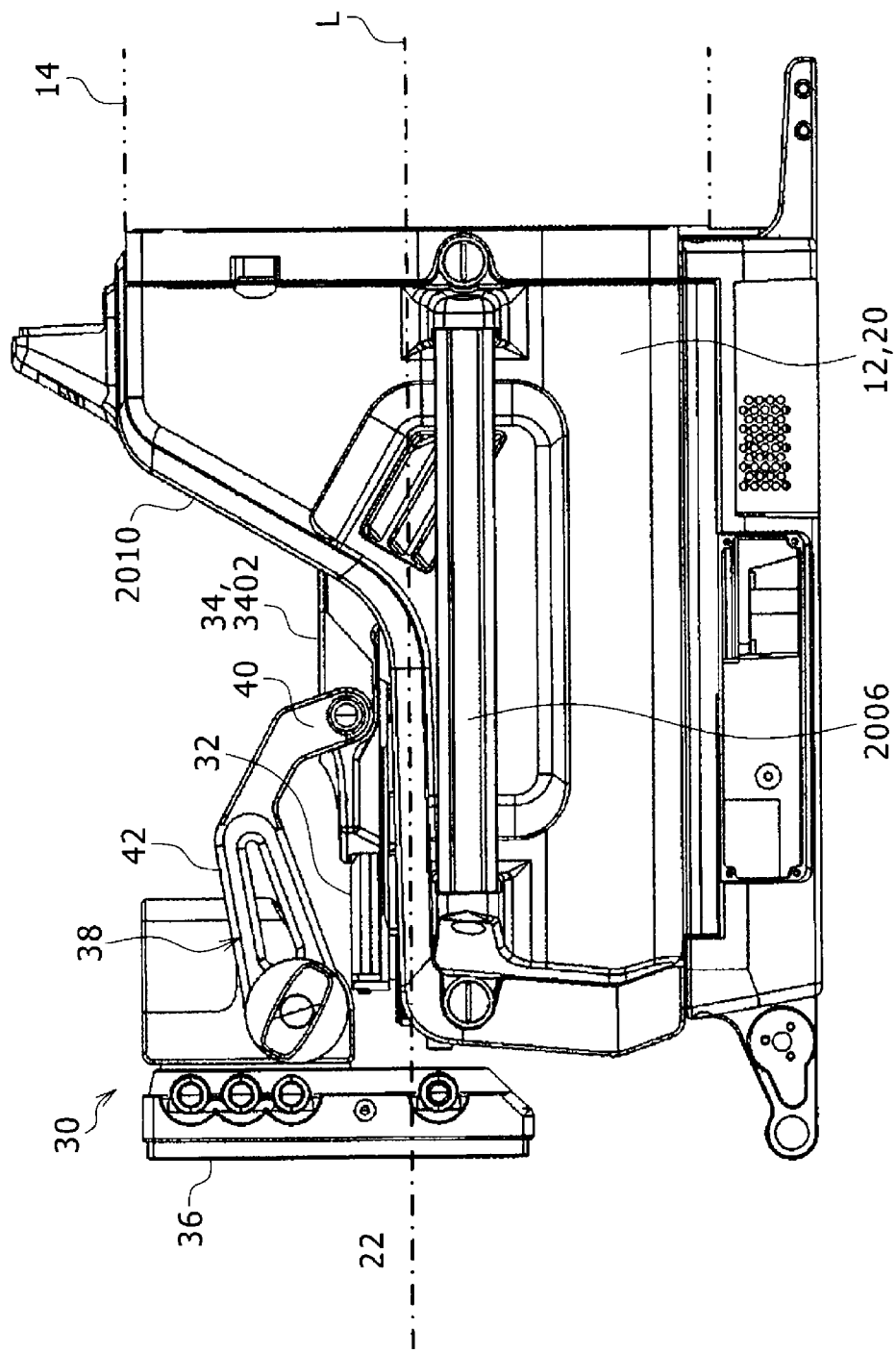
FIG. 12 is a lateral view illustrating a state where the display panel in a second display state is located at the front end of the rail.
Figure 13:
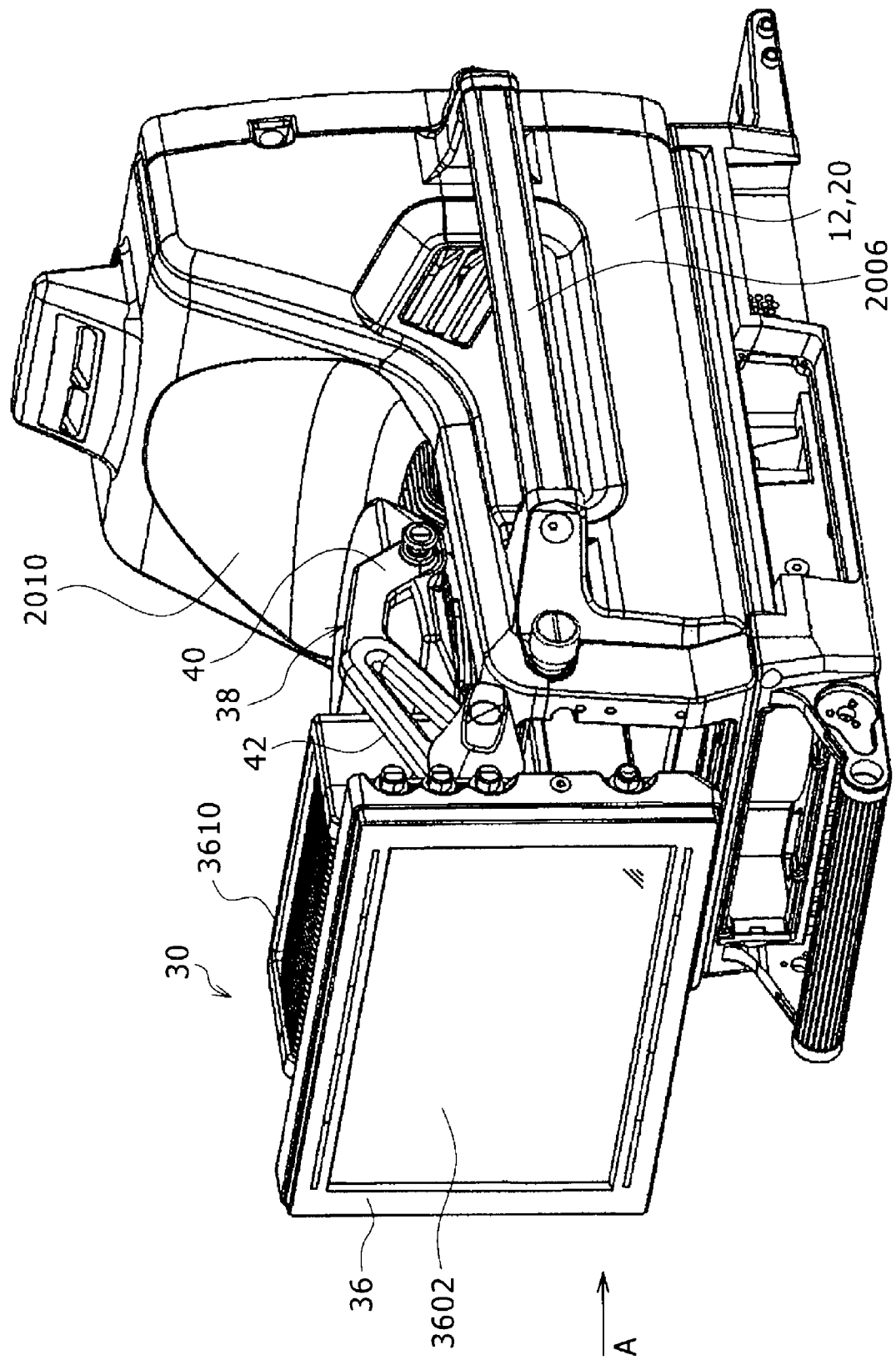
FIG. 13 is a perspective view illustrating a state where the display panel in the second display state is located at the rear end of the rail.
Figure 14:
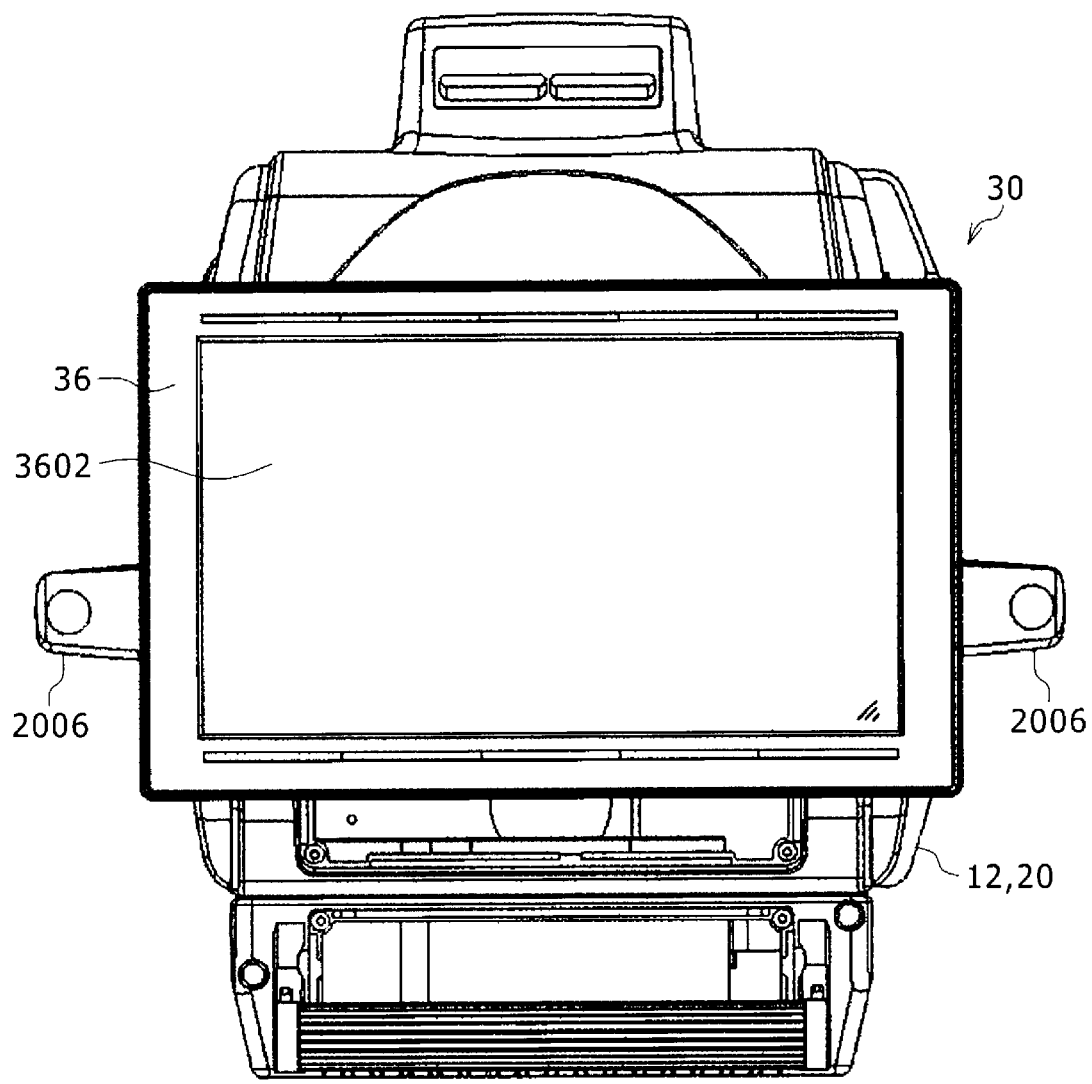
FIG. 14 is a view as viewed from arrow A of FIG. 13.

FIG. 12 is a lateral view illustrating a state where the display panel 36 in a second display state is located at the front end of the rail 32. FIG. 13 is a perspective view illustrating a state where the display panel 36 in the second display state is located at the front end of the rail 32. FIG. 14 is a view as viewed from arrow A of FIG. 13.

Figure 15:
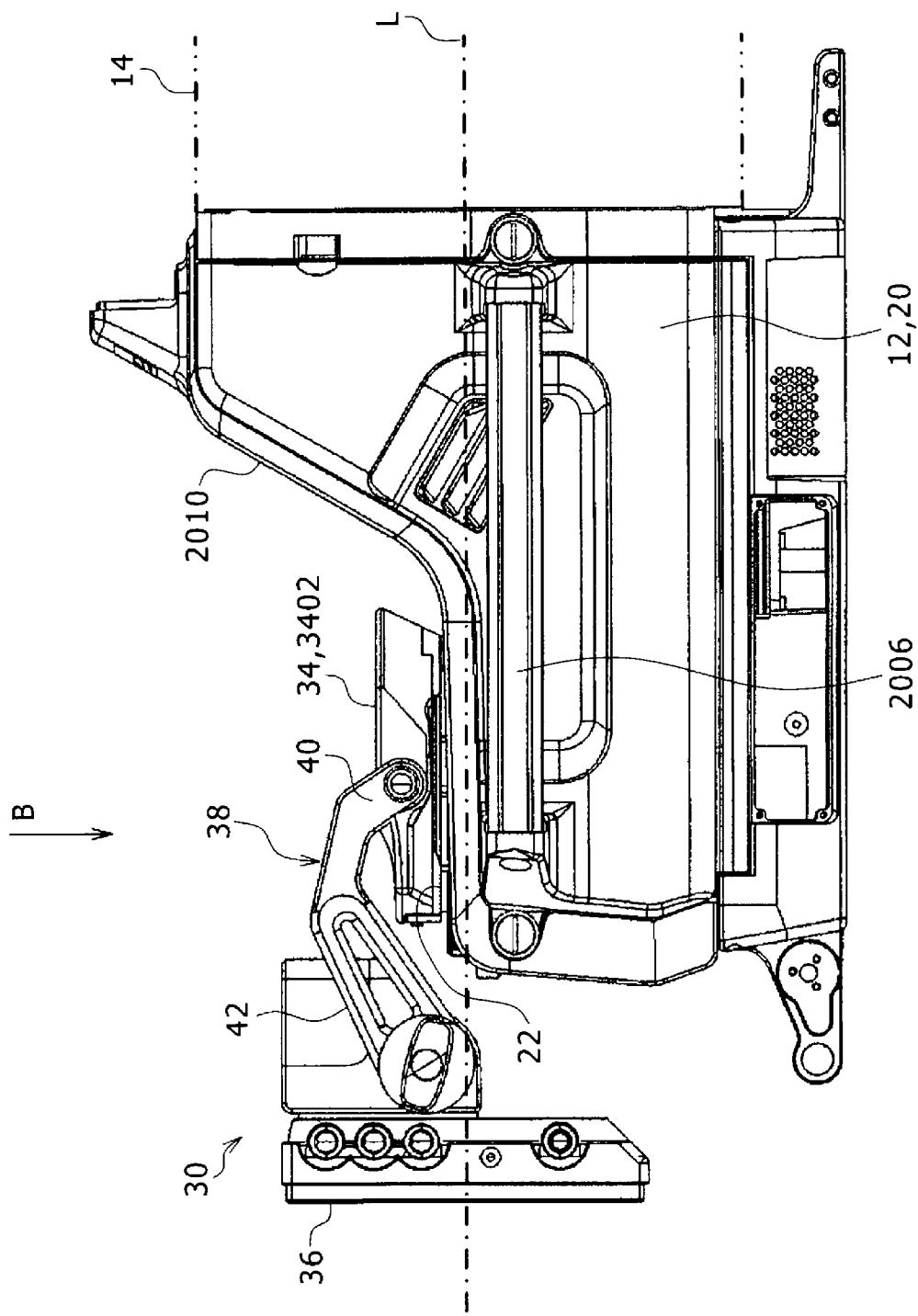
FIG. 15 is a lateral view illustrating the state where the display panel in the second display state is located at the rear end of the rail.
Figure 16:
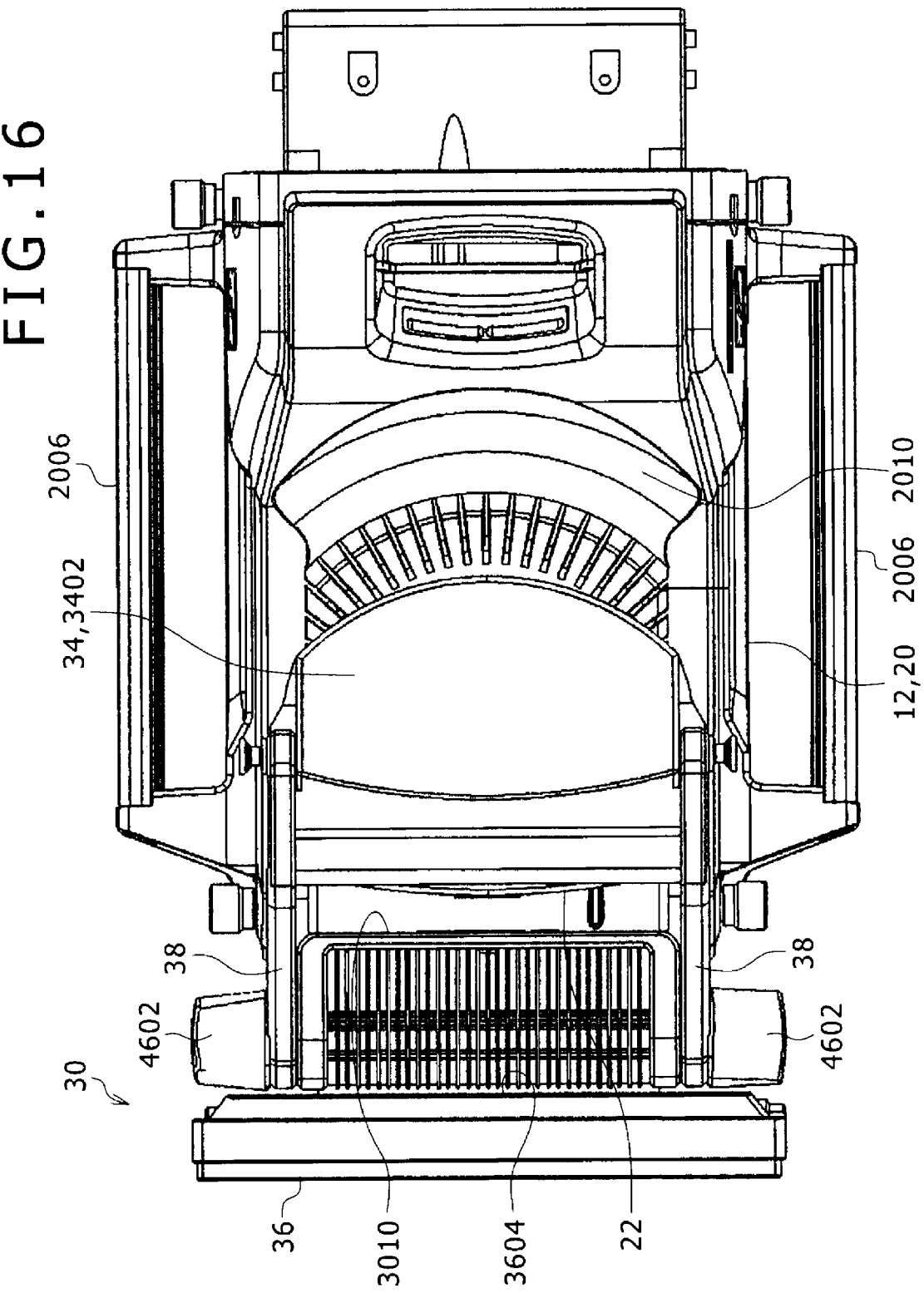
FIG. 16 is a view as viewed from arrow B of FIG. 15.

FIG. 15 is a lateral view illustrating the state where the display panel 36 in the second display state is located at the rear end of the rail 32. FIG. 16 is a view as viewed from arrow B of FIG. 15.

FIG. 17 is a rear view of the camera body 12 from which the viewfinder 30 is removed.

As illustrated in FIGS. 6 through 9, the viewfinder 30 is mounted to the concave portion 2010, specifically, on the turntable 22 provided on the bottom surface 2012 of the concave portion 2010.

The viewfinder 30 includes the rail 32, a seat 34, a display panel 36 and a pair of arms 38.

(Rail 32)

The rail 32 is removably attached to the center of the turntable 22. Incidentally, the attachment of the rail 32 can adopt traditionally known attachment structures such as using a screw.

The rail 32 extends in the diameter direction of and on the turntable 22 and is illustrated so as to extend in the back and forth direction in the figures.

(Seat 34)

The seat 34 is connected to the rail 32 so as to be movable in the extending direction of the rail 32.

The seat 34 has an outline greater than that of the turntable 22. The rail 32 is connected to the lower center of the seat 34.

The left and right lateral portions of the seat 34 extend in the extending direction of the rail 32.

A lock mechanism is attached to the seat 34 to hold it at a desired position.

Incidentally, the structure of the seat 34 movably connected to the rail 32 and the structure of the lock mechanism for holding the seat 34 at the desired position can adopt traditionally known configurations.

(Arm 38)

The pair of arms 38 are adapted to support the display panel 36 on the seat 34.

Figure 7:
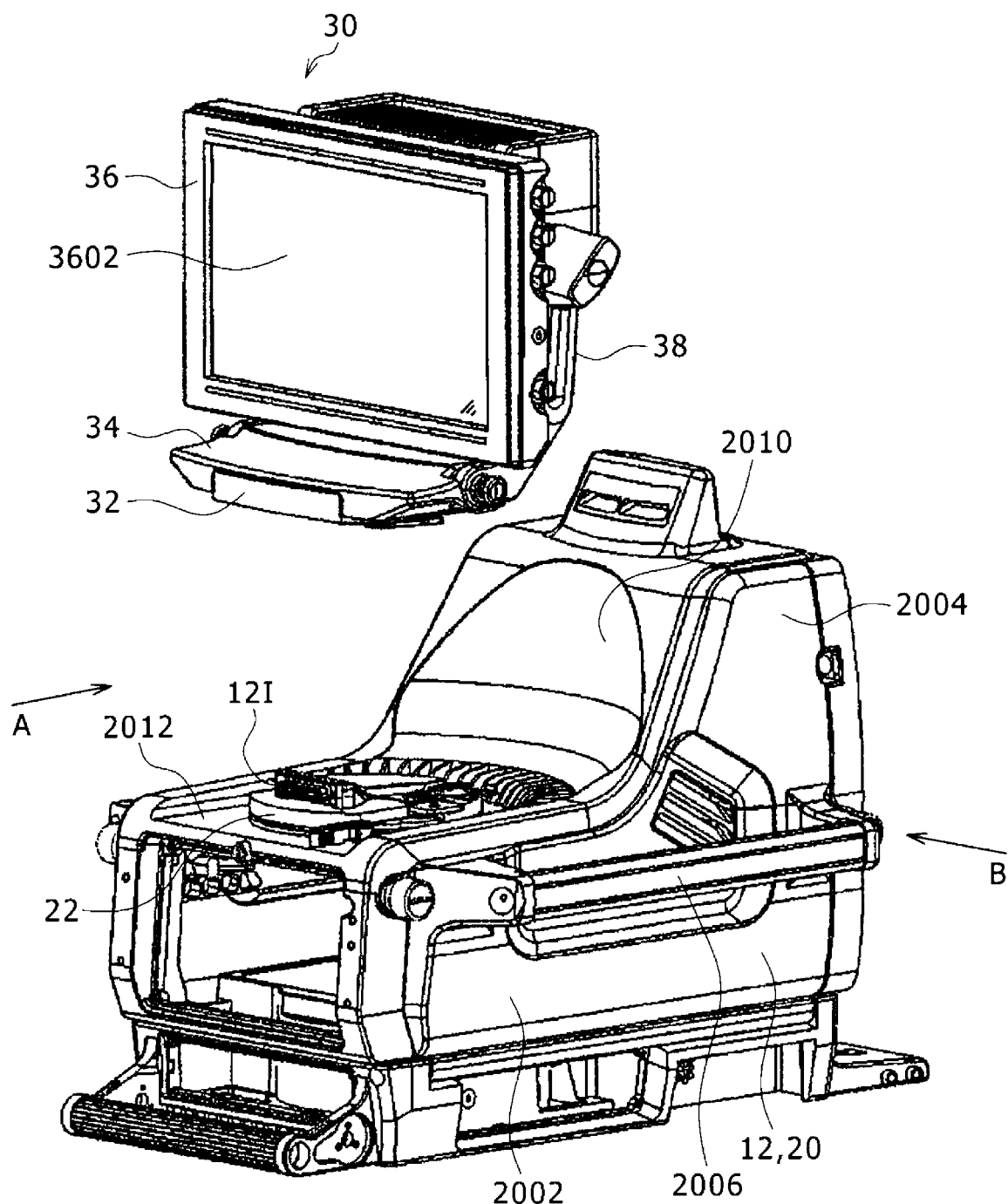
FIG. 7 is a perspective view illustrating mounting operation of the viewfinder to the camera body.

As illustrated in FIGS. 7 and 16, one end of each of the arms 38 is turnably connected to a corresponding one of the left and right lateral portions of the seat 34.

The other end of each of the arms 38 is turnably connected to the rear surface 3604 of the display panel 36 at a vertically intermediate portion inside a corresponding one of the left and right sides, the rear surface 3604 being located oppositely to the display surface 3602 of the display panel 36.

As illustrated in FIGS. 10 and 16, in the embodiment, a protruding portion 3610 is provided to protrude from the vertically intermediate portion of the rear surface 3604 and extend in the left-right direction. The other end of each arm 38 is turnably connected to the protruding portion 3610.

Referring to FIG. 9, the arms 38 are each configured such that a seat side linearly extending arm portion 40 is joined to a panel side linearly extending arm portion 42 to form an L-shape.

Referring to FIG. 10, a lacking portion 4202 is provided at a widthwise central portion of the panel side arm portion 42 to extend in the longitudinal direction of the panel side arm portion 42 in the present embodiment.

The provision of such the lacking portion 4202 is advantageous to reduce the weight of the arm 38 as well as to maintain the strength of the arm 38.

One end of the arm 38 turnably connected to each of the left and right lateral portion of the seat 34 is an end of the seat side arm portion 40 located oppositely to the panel side arm portion 42.

A portion where the end of the seat side arm portion 40 located oppositely to the panel side arm portion 42 is turnably connected to each of the left and right lateral portions of the seat 34 is a central portion in the extending direction of each of the left and right lateral portions.

The other end of the arm 38 turnably connected to the rear surface 3604 of the display panel 36 at the vertically intermediate portion of each of the left and right intermediate portions is an end of the panel side arm portion 42 located oppositely to the seat side arm portion 40.

A holding mechanism 44 is provided at a portion where the end of the seat side arm portion 40 is turnably connected to each of the left and right lateral portions of the seat 34. This holding mechanism 44 is adapted to hold a turning angle of the seat side arm portion 40 with respect to each of the left and right lateral portions of the seat 34.

A holding mechanism 46 is provided at a portion where the end of the panel side arm portion 42 is turnably connected to the vertically intermediate portion of each of the left and right sides. This holding mechanism 46 is adapted to hold a turning angle of the panel side arm portion 42 with respect to the vertical intermediate portion of each of the left and right sides.

In FIG. 10, reference numeral 4602 denotes an operation knob constituting part of the holding mechanism 46 provided at an upper end portion of the panel side arm portion 42.

Operation of the operating knob 4602 permits the display panel 36 to turn the display panel 36 with respect to the panel side arm portion 42 or holds the turning position of the display panel 36.

In the present embodiment, the lacking portion 4202 is provided in the panel side arm portion 42 to thereby ensure the wide width of the upper end portion of the panel side arm portion 42 provided with the operating knob 4602. This can increase the outline of the operating knob 4602, which is advantageous to improve the operability of the operating knob 4602.

Incidentally, the holding mechanisms 44, 46 can adopt traditionally known configurations such as a click mechanism, a screw-fastening mechanism, and a friction mechanism.

(Display Panel 36)

As illustrated in FIG. 6, the display panel 36 includes a display surface 3602 adapted to display images picked up by the image pickup apparatus 10.

The display panel 36 is formed in a rectangle having left and right sides and upper and lower sides.

As illustrated in FIGS. 6, 10 and 11, the display panel 36 is brought into a first display state where the display surface 3602 rises on an upper surface 3402 of the seat 34 perpendicularly to the upper surface 3402.

In the first display state, the seat side arm portion 40 extends from the portion turnably connected to the seat 34 along each of the left and right lateral portions of the seat 34 in the direction of proceeding from the display surface 3620 toward the rear surface 3604. The panel side arm portion 42 extends upward from the extending-directional end.

Additionally, in the first state, a portion of each of the left and right arms 38 located close to the rear surface 3604 of the display panel 36 is located within the outline of the display panel 36 as viewed from the display surface 3602, as illustrated in FIG. 10.

Referring to FIGS. 12 through 15, the display panel 36 is brought into a second display state where the display panel 3602 is located forward of the seat 34 so as to be perpendicular to an imaginary-extending surface of the upper surface 3402.

In the second display state as illustrated in FIG. 15, the display panel 36 is located at a position rearward remote from the housing 20. In addition, an extended line of the optical axis L of the image pickup optical system 16 passes the general center of the display surface 3602. In other words, the center of the display surface 3602 is generally coincident with the optical axis L of the image pickup optical system 16.

As illustrated in FIG. 15, in the second display state, the seat side arm portion 40 is tilted such that a portion close to the panel side arm portion 42 is located higher than a portion turnably connected to the seat 34 and close to the display panel 36. The panel side arm portion 42 is tilted such that the portion turnably connected to the display panel 36 is located lower than a portion close to the seat side arm portion 40 and close to the display panel 36.

As illustrated in FIGS. 12, 14 and 16, the left and right arms 38 are located within the outline of the display panel 36 as viewed from the display surface 3602 in the second display state.

Incidentally, the rail 32 extends in the back and forth direction while being mounted to the turntable 22 in the present embodiment.

(How to Use)

A description is next given of how to use the viewfinder 30 and the image pickup apparatus 10 in the present embodiment.

As illustrated in FIG. 9, the rail 32 of the viewfinder 30 is allowed to face the turntable 22 of the camera body 12 and then, as illustrated in FIG. 10, the rail 32 of the viewfinder 30 is mounted to the turntable 22 of the camera body 12.

Consequently, the connector 3001 (FIG. 5) of the viewfinder 30 is coupled to the connector 12I (FIGS. 7, 17) of the image pickup apparatus 10 so that a video signal supplied from the signal processing section 12C of the image pickup apparatus 10 can be supplied to the viewfinder 30 via the connectors 12I, 3001.

As illustrated in FIG. 10, the turntable 22 is turned to allow the rail 32 to be aligned with the back and forth direction of the image pickup apparatus 10. In other words, the rail 32 is made parallel to the optical axis L of the image pickup optical system 16 (FIG. 5). In such a state, the viewfinder 30 in the first display state is moved in the extending direction of the rail 32 to thereby enable the optional adjustment of the distance between user's eyes and the display surface 3602 of the viewfinder 30 without varying the vertical position of the display surface 3602. Thus, the display surface 3602 can be located at the most easily viewable position according to the user's eyesight.

In particular, if the viewfinder 30 is shifted to the front end position of the rail 32 illustrated in FIG. 11, the distance between the user's eyes and the display surface 3602 of the viewfinder 30 can be maximized. Even if being farsighted, the user can visually recognize the display surface 3602 with ease, which is advantageous to enhance operability.

In the state where the viewfinder 30 is located at the front end position of the rail 32 as illustrated in FIG. 12, the arms 38 are pivoted to bring the display panel 36 into the second display state. In this state, the display surface 3602 can be located near the rear surface of the camera body 12 at a position rearward away from the camera body 12. Thus, the user can visually recognize the display surface 3602 in the most natural posture.

As illustrated in FIGS. 13 through 15, in the state where the viewfinder 30 is located at the rear end position of the rail 32, the arms 38 are pivoted to bring the display panel 36 into the second display state. In this state, the center of the display surface 3602 can be aligned with the optical axis L of the image pickup optical system 16. Thus, the user can visually recognize the display surface 3602 with the least parallax.

Consequently, if a subject moves quickly in a scene such as sports or the like, operability can be enhanced in allowing the orientation of the image pickup apparatus 10 (the image pickup optical system 16) to constantly follow the subject.

According to the present embodiment as described above, since the viewfinder 30 is mounted to the image pickup apparatus 10 so as to be movable along the rail 32 without varying the vertical position of the display surface 3602 so that the distance between the user's eyes and the display surface 3602 of the display panel 36 can be adjusted according to the user's eyesight. Thus, the display surface 3602 can visually be recognized with ease, which is advantageous to enhance operability.

The other end of each of the arms 38 is turnably connected to the vertical intermediate portion of a corresponding one of the left and right sides included in the rear surface 3604 of the display panel 36. Therefore, the distance between the user's eyes and the display surface 3602 is small in variation in pivoting the display panel 36 compared with the case where the pivotal support point of the display panel 36 is located at the upper portion thereof. Thus, this is advantageous to ensure the visibility of the display surface 3602.

The display panel 36 is arranged so as to be brought into the first display state where the display surface 3602 rises on and perpendicularly to the upper surface 3402 of the seat 34 and into the second display state where the display surface 3602 is forward of the seat 34 and perpendicularly to the imaginary extending surface of the upper surface 3402. Thus, the posture and position of the display surface 3602 can variously be changed. This is advantageous to ensure the flexibility of selecting the posture and position of the display panel 36.

In addition, in the first display state, a portion of each of the left and right arms 38 located close to the rear surface 3604 of the display panel 36 is located within the outline of the display panel 36 as viewed from the display surface 3602. In the second display state, the whole of each of the left and right arms 38 is located within the outline of the display panel 36 as viewed from the display surface 3602. Thus, when the user turns her or his eyes to the actual subject from the display surface 3602, the arms 38 will not interfere with the line of sight. This is advantageous to ensure smooth operability during photographing.

In the present embodiment, the arms 38 are each configured such that the seat side linearly extending arm portion 40 is joined to the panel side linearly extending arm portion 42 to form an L-shape. In the first display state, the seat side arm portion 40 extends from a portion turnably connected to the seat 34 along each of the left and right lateral portions of the seat 34 in the direction of proceeding from the display surface 3602 toward the rear surface 3604. Further, the panel side arm portion 42 extends upward from such an extending-directional end. In the second display state, the seat side arm portion 40 is tilted such that a portion close to the panel side arm portion 42 is located higher than the portion turnably connected to the seat 34 and close to the display panel 36. The panel side arm portion 42 is tilted such that the portion turnably connected to the display panel 36 is located lower than a portion close to the seat side arm portion 40 and close to the display panel 36.

Thus, this is advantageous to ensure a large pivotal range of the display panel 36 with the arms 38 not interfering with the display panel 36 and with the housing 20 of the camera body 12.

This can ensure a large adjustment range of the display surface 3602 of the display panel 36, which is advantageous not only to enhance usability but also to ensure the vertical size of the display surface 3602 of the display panel 36. In other words, this is advantageous to increase the size of the display surface 3602.

The present application contains subject matter related to that disclosed in Japanese Priority Patent Application JP 2008-097155 filed in the Japanese Patent Office on Apr. 3, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A viewfinder comprising:
a rail removably attached to an image pickup apparatus;
a seat coupled to the rail so as to be movable in an extending direction of the rail;
a display panel formed in a rectangle having left and right sides and upper and lower sides to have a display surface on which an image picked up by the image pickup apparatus is displayed; and
a pair of left and right arms supporting the display panel on the seat;
wherein one end of each of the arms is turnably connected to a corresponding one of left and right lateral portions of the seat, and
the other end of each of the arms is turnably connected to a rear surface of the display panel at a vertically intermediate portion inside each of the left and right sides, the rear surface of the display panel being located oppositely to the display surface,
the display panel is arranged to be brought into a first display state where the display surface is located on an upper surface of the seat so as to rise perpendicularly to the upper surface thereof and into a second display state where the display surface is located at a position away from the seat to face a direction away from the seat and to be perpendicular to an imaginary extending surface of the upper surface, and
in the first display state, a portion of each of the left and right arms located close to the rear surface of the display panel is located within an outline of the display panel as viewed from the display surface side.

2. The viewfinder according to claim 1,
wherein the arms are each formed such that a seat side linearly extending arm portion is coupled to a panel side linearly extending arm portion to provide an L-shape,
the one end of the arm turnably connected to each of the left and right lateral portions of the seat is an end portion of the seat side arm portion located oppositely to the panel side arm portion, and
the other end of each of the arms turnably connected to the rear surface of the display panel at the vertically intermediate portion of each of the left and right sides is an end portion of the panel side arm portion located oppositely to the seat side arm portion.

3. The viewfinder according to claim 2,
wherein in the first display state, the seat side arm portion extends from the portion turnably connected to the seat along each of the left and right lateral portions of the seat in a direction of proceeding from the display surface toward the rear surface and the panel side arm portion extends upward from the extending-directional end, and
in the second display sate, the seat side arm portion is tilted such that a portion close to the panel side arm portion is located higher than the portion turnably connected to the seat and close to the display panel, and the panel side arm portion is tilted such that a portion turnably connected to the display panel is located lower than a portion close to the seat side arm portion and close to the display panel.

4. The viewfinder according to claim 2,
wherein the left and right lateral portions of the seat extend in the extending direction of the rail, and
a portion where the end of the seat side arm portion located oppositely to the panel side arm portion is turnably connected to each of the left and right lateral portions of the seat is a central portion in the extending direction of each of the left and right lateral portions.

5. The viewfinder according to claim 2,
wherein the panel side arm portion is provided at a widthwise central portion with a lacking portion extending in a longitudinal direction of the panel side arm portion.

6. The viewfinder according to claim 1,
wherein the left and right arms are located within the outline of the display panel as viewed from the display surface side in the second display state.

7. An image pickup apparatus comprising:
a housing; and
a viewfinder;
the viewfinder including
a rail removably attached to the n image pickup apparatus,
a seat coupled to the rail so as to be movable in an extending direction of the rail,
a display panel formed in a rectangle having left and right sides and upper and lower sides to have a display surface on which an image picked up by the image pickup apparatus is displayed, and a pair of left and right arms supporting the display panel on the seat, wherein one end of each of the arms is turnably connected to a corresponding one of left and right lateral portions of the seat, the other end of each of the arms is turnably connected to a rear surface of the display panel at a vertically intermediate portion inside each of the left and right sides, the rear surface of the display panel being located oppositely to the display surface, the display panel is arranged to be brought into a first display state where the display surface is located on an upper surface of the seat so as to rise perpendicularly to the upper surface thereof and into a second display state where the display surface is located at a position away from the seat to face a direction away from the seat and to be perpendicular to an imaginary extending surface of the upper surface, and in the first display state, a portion of each of the left and right arms located close to the rear surface of the display panel is located within an outline of the display panel as viewed from the display surface side.

8. The image pickup apparatus according to claim 7, wherein the housing is provided with a turntable and the rail is removably attached to the turntable.

9. The image pickup apparatus according to claim 7, further comprising an image pickup optical system, wherein the image pickup optical system is connected to a front portion of the housing, the housing is provided with a concave portion opening upward and rearward, and the viewfinder is disposed in the concave portion.

10. The image pickup apparatus according to claim 7, further comprising an image pickup optical system, wherein the image pickup optical system is connected to a front portion of the housing, the housing is provided with a concave portion opening upward and rearward, and the rail is removably attached to a bottom surface of the concave portion so as to extend in a back and forth direction.

11. The image pickup apparatus according to claim 7, further comprising an image pickup optical system, wherein the image pickup optical system is connected to a front portion of the housing, the housing is provided with a concave portion opening upward and rearward, the rail is removably attached to a bottom surface of the concave portion so as to extend in a back and forth direction, and in the second display state, the display panel is located at a position reward away from the casing.

12. The image pickup apparatus according to claim 7, further comprising an image pickup optical system, wherein the image pickup optical system is connected to a front portion of the housing, the housing is provided with a concave portion opening upward and rearward, the rail is removably attached to a bottom surface of the concave portion so as to extend in a back and forth direction, and in the second display state, the display panel is located at a position reward away from the casing and an extended line of an optical axis of the image pickup optical system passes the center of the display surface.

* * * * *